(12) United States Patent
Burns, II

(10) Patent No.: US 6,729,800 B2
(45) Date of Patent: May 4, 2004

(54) FLOW VELOCITY ENHANCEMENT SYSTEM

(76) Inventor: Gordon Charles Burns, II, 2120 S. Reserve 1360, Missoula, MT (US) 59801

( * ) Notice: Subject to any disclaimer, the term of this patent is extended or adjusted under 35 U.S.C. 154(b) by 0 days.

(21) Appl. No.: 10/268,663

(22) Filed: Oct. 11, 2002

(65) Prior Publication Data

US 2003/0072617 A1 Apr. 17, 2003

Related U.S. Application Data

(60) Provisional application No. 60/328,903, filed on Oct. 12, 2001.

(51) Int. Cl.$^7$ .................................................. E02B 8/08
(52) U.S. Cl. ........................................ 405/81; 119/219
(58) Field of Search ...................... 405/80, 81; 119/219

(56) References Cited

U.S. PATENT DOCUMENTS

| | | | | |
|---|---|---|---|---|
| 2,612,861 A | * | 10/1952 | Burkey | 119/219 |
| 2,751,881 A | * | 6/1956 | Burkey | 119/219 |
| 2,761,421 A | * | 9/1956 | Burkey | 119/219 |
| 4,029,049 A | | 6/1977 | Hillier | |
| 4,740,105 A | | 4/1988 | Wollander | |
| 5,263,833 A | | 11/1993 | Robinson et al. | |
| 5,632,572 A | | 5/1997 | Chicha | |
| 5,673,449 A | * | 10/1997 | Henriksson et al. | 405/81 |
| 6,102,619 A | | 8/2000 | Truebe et al. | |

OTHER PUBLICATIONS

Proline Mining Equipment, Dredge High bunker Combinations, Proline Mining Equipment Catalogue, undated, pp. 2–7, Proline Mining Equipment, Coulterville, California U.S.A.

Proline Mining Equipment, Parts and Accessories, Proline Mining Equipment Catalogue, undated, back inside cover, Proline Mining Equipment, Coulterville, California U.S.A.
Charles C. Coutant, Turbulent Attraction Flows for Guiding Juvenile Salmonids at Dams, Charlotte, North Carolina in 1999, Behavioral Technologies for Fish Guidance, Charles C. Coutant Ed., Aug. 30–31, 1999, pp. 57–77, American Fisheries Society Symposium 26, Bethesda, MD, U.S.A.
Darland, Feil, Hausmann, Smith and Rondorf, and Serl and Morrill, Annual Report for 2000: Evaluation of Directed Flow to Improve Fish Guidance for the Surface Collection Program, Cowlitz Falls Dam, Dec. 12, 2001, pp. 1–35, U.S. Army Corps of Engineers, Contract W68SVB00630772, Walla Walla, WA, U.S.A.
Darland, Evans, Rondorf, Rutz, Feil and Adams, and Morrill and Serl, Annual Report for 1999: Test of Concept to Improve Fish Guidance Using Induced Water Currents at Cowlitz Falls Dam, Washington, Mar. 2001, pp. 1–40, U.S. Army Corps of Engineers, Contract W68SBV90053698–004, Walla Walla, WA, U.S.A.

* cited by examiner

*Primary Examiner*—Frederick L. Lagman
(74) *Attorney, Agent, or Firm*—Gough, Shanahan, Johnson & Waterman; William L. MacBride, Jr.

(57) ABSTRACT

A method for enhancing or generating a water flow current by the generation of a velocity head differential, to guide fish, including: a venturi eductor to induce higher water pressures; a pump, piping or other motive water source; an adjustable frame to mount the venturi eductor; and a method of using this equipment. Fish may be guided into or away from a waterway area by generating or enhancing a current to guide them. The apparatus may be used as a method to guide fish through low velocity areas of a river, lake, reservoir or other waterway. The apparatus may also be used as a method to create water flow velocities that fish are reluctant to pass through for a barrier or curtain to further guide the fish. The apparatus and method may also be used to transfer temperature-variant water in a waterway.

7 Claims, 7 Drawing Sheets

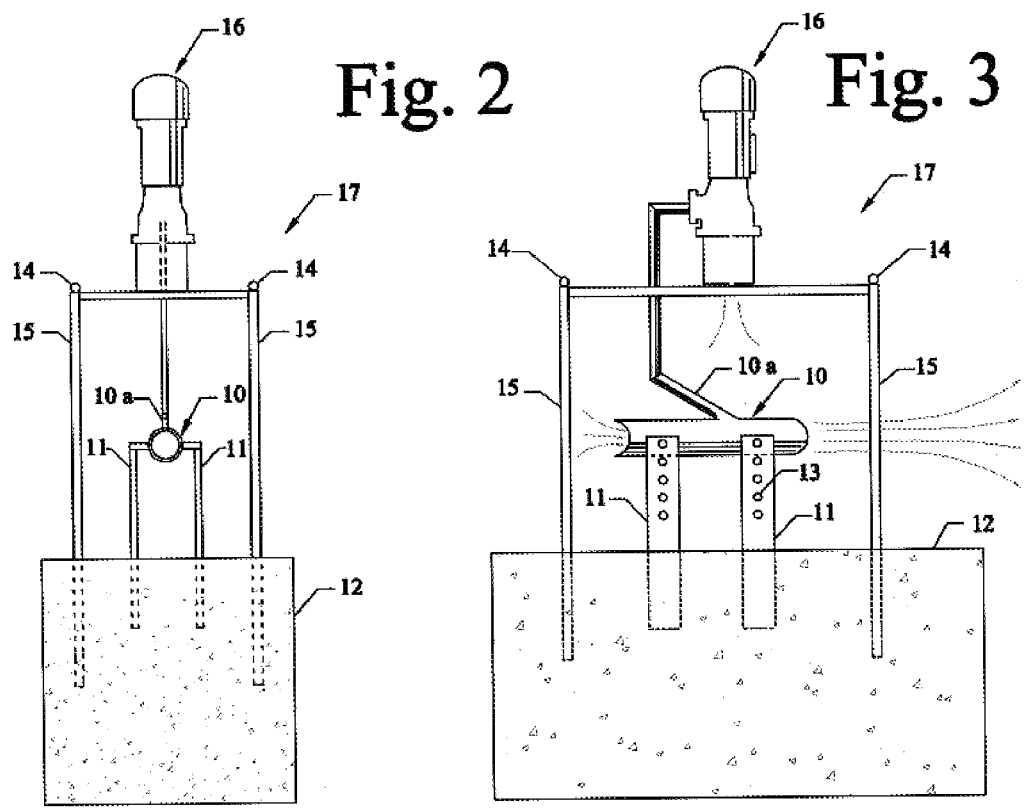

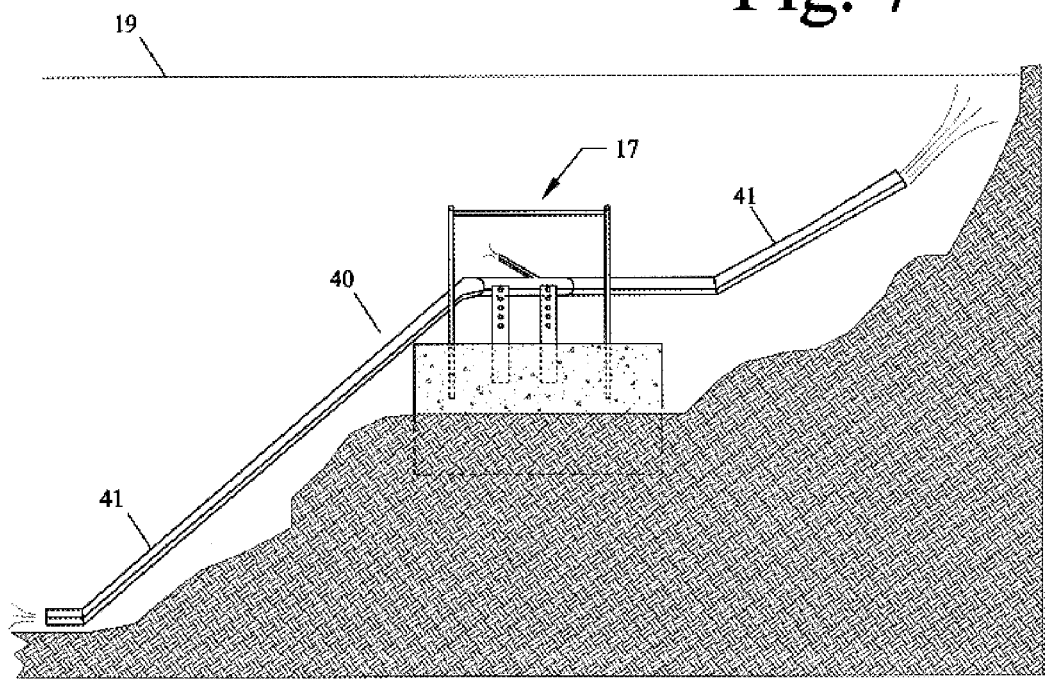

FLOW VELOCITY ENHANCEMENT SYSTEM

This application claims priority from the provisional patent application filed Oct. 12, 2001, Application No. 60/328,903 and Confirmation No. 1899.

BACKGROUND

This invention relates to an apparatus and method for modifying the behavior of fish, through a mechanical enhancement of water flow current velocities within a waterway to guide fish from obstructions, such as hazardous areas in a waterway, or to obstruction collection systems. Specifically, it relates to an apparatus and method that modify fish travel patterns by generating a water flow current which creates a velocity head differential in the waterway that fish can sense to guide or direct them during their travels, such as during waterway migration.

Waterway obstructions and other man-made waterway devices pose a risk to migratory fish, contributing to declining stocks of migratory fish and the listing of some fish as endangered species. Such obstructions and related devices may include hydroelectric power plants, municipal water intakes, thermal power plants and irrigation systems.

Recent studies of salmonids have illustrated juvenile fish migration patterns in waterways. Juvenile fish out migrate by orienting, or guiding, on bulk flows of old river channels. These channels, denoting the deepest parts or principal navigational channels of a waterway are referred to as thalwegs, as described in Paul W. Thrush, A Dictionary of Mining, Mineral and Related Terms, Paul W. Thrush Ed., 1968, p. 1131, U.S. Bureau of Mines, Washington, D.C. Adult fish also follow the waterway thalwegs on their migration to their natal streams. Fish suffer trauma and/or extended predation when there is insufficient current to guide them around obstructions or direct them to bypass devices or collection systems that could aid their migration around the obstructions. Fish suffer high mortality rates from such obstructions for a number of reasons; for example: (1) when they come in contact with utility pumps or turbines from the aforementioned devices; (2) when they are subject to thermal water variations induced by nuclear power plants; or (3) when they are ingested or entrained into irrigation systems.

Current fish passage bypass devices or facilities are designed and constructed, essentially, for one of two purposes: (1) for upstream fish passage in a waterway, and (2) for downstream fish passage in a waterway. Upstream fish passage systems, such as fish ladders, are comprised of some type of structure to enable fish to swim up steep inclines. These structures typically utilize a hydrostatic head differential to create a water current at the head of the fish bypass or a fishway. This static head is created by pumped water spilling from a basin or through an orifice or slot. However, this process generates a minor current of limited influence on, and attraction to, the fish and increases migratory delay time while fish search for the entrance to the bypass or fishway. Downstream bypasses or fishways typically consist of barrier devices located at a waterway obstruction, such as at a power plant intake, and some type of physical structure at such obstruction to direct fish around the obstructing facility.

The various devices and methods developed to prohibit entrance to, or direct fish away from, obstructing facility hazards can be categorized as physical barriers or behavioral guidance systems. Physical barriers work by limiting an intake opening size thereby prohibiting entry to fish of a certain size or life stage. These physical barriers include structures such as bar racks, traveling screens, and fixed screens. The main disadvantage to these devices is their cost to construct and maintain. Another disadvantage is that the devices can limit water intake flows, thereby limiting a facility's power production. These disadvantages ultimately can result in an adverse and unnecessary economic impact on the entity responsible for construction and maintenance of the waterway obstructing facility.

Behavioral guidance systems rely on fish behavioral responses in order to divert fish from a waterway intake or to a collection system device. Current waterway guidance systems include lights, electric fields, turbulence generators, and sound deterrents. Underwater lights, such as strobes, are fish species specific. The visibility of lights to fish, and thus their effectiveness in directing fish in the waterway, varies according to the changing water clarity within the waterway at various times of the year. Underwater electric fields or electric currents in the waterway present a human safety concern. As well, their effectiveness is affected by changing water conductivity. Finally, what is a safe electric current for one species of fish may be deadly for another. Turbulence producing systems, such as air bubble curtains, are energy intensive and are not effective for some species of fish. Sound deterrents are not particularly reliable at present, and an uninterrupted sound barrier to direct fish is difficult to achieve. Furthermore, a sound wave produced by such a system must be tuned for each species of fish and sometimes tuned for separate periods of a life cycle for an individual species of fish.

Persons skilled in the art know the migrational characteristics that are specific to different species of fish, as described (with respect to salmonids in this particular reference) in Adams, Rondorf and Kofoot, and Banach and Tuell, Annual Report 1996: Migrational Characteristics of Juvenile Chinook Salmon and Steelhead in the Forebay of Lower Granite Dam Relative to the 1996 Surface Bypass Collector Tests, 1997, 260 pp., Report to the U.S. Army Corps of Engineers, Contract E-8693151, Walla Walla, Wash. Although this particular reference deals specifically with salmonids, the apparatus and method of the present invention can be applied to any fish species that exhibits migrational characteristics.

Fish ladders associated with a waterway obstruction work by the release of a certain amount of water over the ladders. This water discharge, known as negative static head differential, provides a water current attractive to fish and water in which the fish can swim within the ladder. However, fish ladders are costly due to the loss of power generating revenues by the diversion of water required to operate the ladders. Fish ladders are not particularly effective for the seaward or downstream migration of juvenile fish.

There is limited related art concerning the mechanical generation of water currents to guide or direct fish from obstructive, hazardous areas or to collection systems. Fish ladders, as discussed above, generate currents through water flowing from a higher to a lower elevation.

DESCRIPTION OF THE RELATED ART

There is limited related art concerning the mechanical generation of currents to guide fish, as mentioned above. The devices and methods that have been developed are either of the physical barrier or behavioral guidance system type, all having particular problems in their attempts to guide or direct fish. U.S. Pat. No. 4,740,105 to Wollander (1988) uses a screen barrier arrangement system, and U.S. Pat. No. 4,029,049 to Hillier (1977) uses a net barrier system.

Other art related to the mechanical generation of waterway currents for guiding or directing fish, such as U.S. Pat. No. 5,263,833 to Robinson, et al (1993) and U.S. Pat. No. 5,632,572 to Chicha (1997) use floating or buoyant devices with numerous positioning components and members. U.S. Pat. No. 6,102,619 to Truebe, et al (2000) uses a propeller to generate currents to guide fish. These inventions are very complex and energy intensive, and therefore very expensive. Furthermore, they are limited in their flexibility and adaptability to different fish species, and, in the case of propeller generation, potentially harmful to fish that can come into contact with the current generating device. These inventions are limited, as well, in their ability to create enough flow to simulate the necessary waterway bulk flows, or thalweg conditions. In these respects, it can be considered that there is no prior art whatsoever relating to the present invention.

SUMMARY

The present invention has many objectives. Among them are the following:

To provide an apparatus for providing within a waterway a fish guidance system comprising: means for generating a velocity head differential in a waterway when said means is installed in a waterway, means for using said generated velocity head differential when said generating means is installed in a waterway to create a current of water within said waterway which fish can sense and use to guide them during their travel through the waterway, and means for directing said generated current of water in said waterway in a desired direction whereby the fish that sense said current of water will travel in the direction of said generated current of water.

To provide a fish guidance system that imitates or duplicates waterway thalweg conditions, or bulk flows;

To provide a fish guidance system that is cost effective;

To provide a fish guidance system that is composed of commercially available components;

To provide a fish guidance system that is reasonably portable and easily and economically deployed.

To provide an apparatus as aforesaid including frame means for supporting in said waterway said means for using said generated velocity head differential to create a current of water within said waterway.

To provide a fish guidance system that is readily and easily adjustable for varying site requirements.

To provide an apparatus as aforesaid in which said frame means includes a base means.

To provide a fish guidance system that is low maintenance;

To provide an apparatus as aforesaid in which the means for using said generated velocity head differential includes: a venturi educator having an eductor tube including a sidewall defining a bore extending there through, said eductor tube having a water intake end and a water discharge end; and a venturi nozzle having water inlet and outlet ends, said venturi nozzle having the outlet end connected in water conducting relationship to the eductor tube at an acute angle directed toward the discharge end of the eductor tube.

To provide an apparatus as aforesaid in which the means for generating a velocity head differential in a waterway includes: a pressure motive water source connected in water conducting relationship with the venturi nozzle thereby creating reduced pressure within said eductor tube so such that during operation of the pressure motive water source water is drawn into the eductor tube at the intake end at a first velocity and discharged at the discharge end at a velocity greater than the first velocity at the intake end.

To provide a method for providing a fish guidance system in a waterway comprising the steps of: generating a velocity head differential; using the generated velocity head differential to create a current of water within a waterway which fish can sense and use to guide them during their travel through the waterway; and directing the current of water so created within the waterway in a desired direction whereby the fish that sense said current of water will travel in the direction of generated current of water;

To provide a fish guidance system which does not require water removal from a reservoir or lake for its operation;

To provide a method as aforesaid in which the step of creating thalweg conditions adjacent the place where current of water is created in the waterway.

To provide a method as aforesaid in which the step of using the generated head differential to create a current of water within a waterway includes: providing a venturi eductor having an eductor tube including a sidewall defining a bore extending there through, said eductor tube having a water intake end and a water discharge end; and a venturi nozzle having water inlet and outlet ends, said venturi nozzle having the outlet end connected in water conducting relationship to the eductor tube at an acute angle directed toward the discharge end of the eductor tube.

To provide a method as aforesaid in which the step of generating a velocity head differential includes: providing a pressure motive water source connected in water conducting relationship with the venturi nozzle thereby creating reduced pressure within said eductor tube so such that during operation of the pressure motive water source is drawn into the eductor tube at the intake end at a first velocity and discharged at the discharge end at a velocity greater than the first velocity at the intake end;

To provide a fish guidance system that does not interfere with, or interrupt, routine plant operation;

To provide a fish guidance system that keeps fish in their natural environment to reduce disease transmission;

To provide a fish guidance system that eliminates the handling of fish;

To provide a fish guidance system that does not require a hydrostatic head differential; and To provide a method for providing a fish guidance system in a waterway comprising the steps of generating a plurality of velocity head differentials, using the plurality of generated velocity head differentials to create a plurality of currents of water within a waterway to create a velocity curtain which fish can sense and use to guide them during their travel through the waterway; and directing the currents of water so created within the waterway in the same general linear direction whereby the fish that sense said current of water will travel in the direction of generated currents of water.

The aforementioned features, aspects and advantages of the present invention, and further objectives and advantages of the invention will become apparent from a consideration of the drawings and ensuing description.

BRIEF DESCRIPTION OF THE DRAWINGS

FIG. 2 Shows an end view of a flow velocity enhancement system according to the present invention mounted on a thrust block with an optional submersible pump as a motive water source.

FIG. 3 Shows an elevation view of the left side of FIG. 2 according to the present invention mounted on a thrust block with an optional submersible pump as a motive water source.

FIG. 7 Shows the use of a flow velocity enhancement system according to the present invention as a means of selective thermal water withdrawal.

DETAILED DESCRIPTION

The present invention may be used in conjunction with man-made obstructions located in a waterway, such as a hydroelectric facility consisting of a dam, a reservoir, and hydroelectric turbines. An objective of the present invention is to direct fish away from the obstructions in the waterway to a fish bypass or fishway or other safe passage around the obstructions, using an apparatus and method for generating a velocity head differential in the waterway.

The preferred embodiment of the flow velocity enhancement system apparatus consists of using a venturi eductor in a waterway as a source for creating a water velocity head differential, used in conjunction with a high pressure motive water source, connected to the venturi eductor, for generating a water flow current. Such venturi eductors include, but are not limited to, power jets that are commercially available for use on gold and/or reclamation dredges from Proline Mining Equipment, Coulterville, Calif.

A venturi eductor functions by high pressure motive water from a remote motive water source passing through the venturi eductor, at a water inlet end of a venturi nozzle, which is attached to an eductor tube at an acute angle, at a water outlet end directed toward a discharge end of the eductor tube. High pressure motive water is provided by the motive water source, such as a pump, and delivered to the venturi eductor by the venturi nozzle through a suitable conduit or hose. The pump that provides motive water can be powered by many sources, such as an electric or hydraulic motor, or a gasoline or diesel engine. Alternatively, where suitable conditions exist, the motive water can be supplied by other means, including but not limited to a siphon pipe, whereby high pressure water is produced by natural head pressure in lieu of a pump. The pump may be a submersible, shore-mounted or other type of commercially available pump, including but not limited to two and one-half (2.5) to nine (9) horsepower pumps available from Proline Mining Equipment.

The passage of the high pressure motive water through the venturi eductor creates a vacuum at an intake end of the eductor tube and a water current flow at the opposite, discharge end, of the eductor tube. Water from the waterway flows into the venturi eductor at the intake end to fill the vacuum created at that end by the water flow through the eductor tube. This function of the venturi eductor induces high flow pressures, creating movements of larger volumes of water flow at the discharge end of the eductor tube, at velocities attractive to fish, higher than the intake end velocities of the waterway, thereby simulating or duplicating a natural thalweg or waterway channel flow in a reservoir, lake or other waterway.

Figure 1:
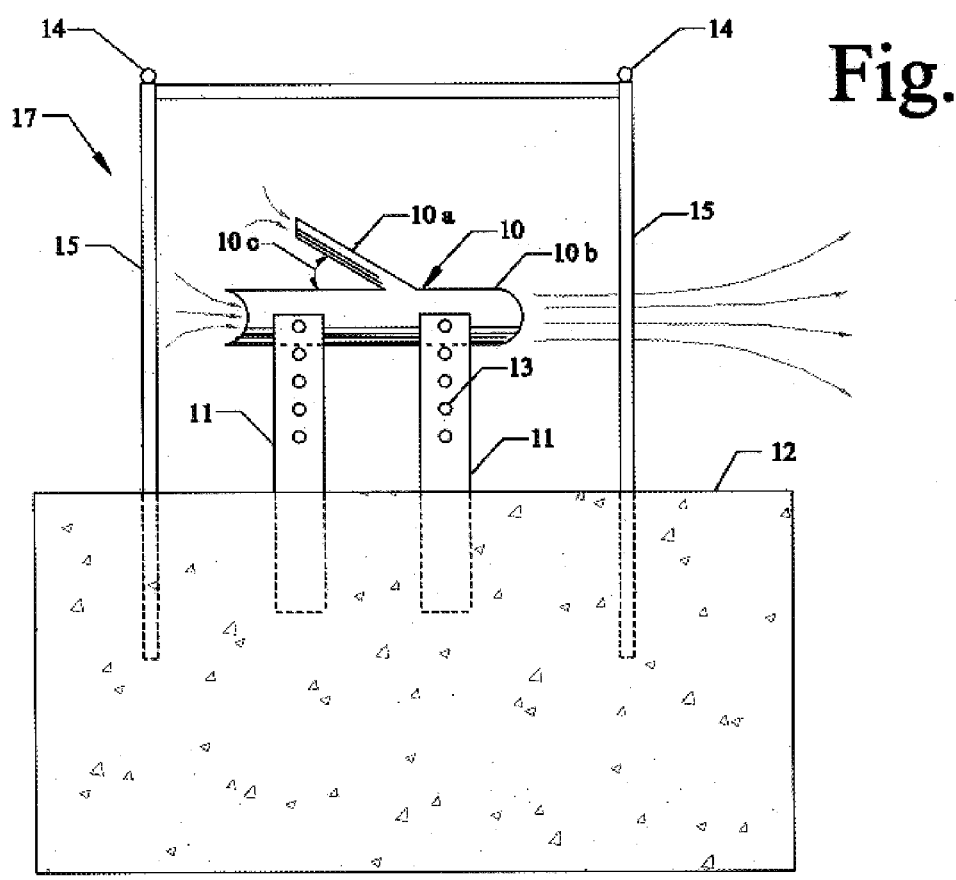
FIG. 1 Shows a perspective view of the preferred embodiment of a flow velocity enhancement system according to the present invention, mounted on a thrust block.

Referring now to FIG. 1, which includes a simplified drawing of one type of the venturi eductor; comprised of a venturi nozzle 10a, attached to an eductor tube 10b at an acute angle 10c. FIG. 1 further shows the preferred embodiment of the present invention, the venturi eductor 10 mounted on an adjustable eductor mount frame 11. The mount frame is made of noncorrosive, rigid material, such as stainless steel or other noncorrosive material. The adjustable eductor mount frame 11 is anchored into a thrust block base 12, made of concrete or similar material, which base is designed to keep the venturi eductor 10 stationary and firmly seated within the adjustable eductor mount frame 11 on the bottom of a reservoir, lake or other type of waterway 19. Collectively, this preferred embodiment of the apparatus is referred to as the flow velocity eductor apparatus or device 17, or in plural as devices.

The adjustable eductor mount frame 11 consists of a plurality of mounting locations 13 located along the vertical legs of the adjustable eductor mount frame 11 to allow the angle of water discharge flow from the venturi eductor 10 to be adjusted for the optimum requirements of any targeted species of fish. The thrust block base 12 may also fitted with a pump mount frame 15, made of non-corrosive material, for mounting an optional submersible pump directly to the venturi eductor at the water inlet end of the venturi nozzle to provide the motive water. The pump mount frame 15 is fitted with "picking" eye bolts 14 to allow for easy installation and/or retrieval of the entire flow velocity eductor apparatus 17 out of the waterway for routine maintenance, or for easy retrieval during seasonal climate changes, for example, to avoid problems with ice forming on the surface of the waterway.

Referring now to FIGS. 2 and 3, these Figures show the present invention equipped with a submersible pump 16 to provide motive water to the venturi nozzle 10a. The submersible pump intake may be fitted with a screened housing to prevent debris from entering the submersible pump 16. The pump discharge is piped directly to the venturi nozzle 10a at its water inlet end to provide motive water to the venturi eductor 10.

The preferred embodiment of the present invention is to mount the venturi eductor 10 on the thrust block base 12 which flow velocity eductor apparatus 17 is then placed on the bottom of a waterway 19, such as a reservoir or lake. This placement allows for simulation of a natural waterway flow thalweg or thalweg condition, such as that in a river. Recent studies and telemetry tracking have shown that juvenile salmonids closely follow this thalweg. The submerged installation of the flow velocity eductor apparatus 17 also allows for a more aesthetically pleasing installation while reducing the danger to normal waterway surface traffic. However, where it is desirable or necessary for fish guidance, the flow velocity eductor apparatus 17 can be mounted to any above-water surface base, as an alternative to the thrust block base, such as a dam face or an existing physical guidance structure that is a substantial enough base to provide a rigid mount for the apparatus. The venturi eductor 10 could be mounted, as well, on a barge as a base to provide an easily transportable guidance system.

Figure 4:
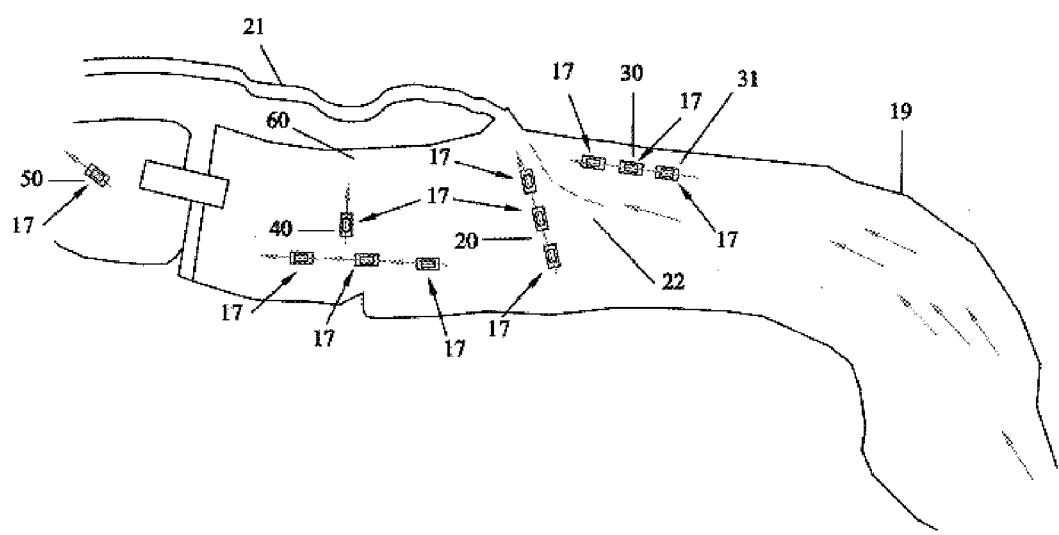
FIG. 4 Shows various applications for the flow velocity enhancement system, according to the present invention.

FIG. 4 shows some of the applications for the flow velocity enhancement system method of the present invention. In one preferred embodiment of the present invention, flow velocity eductor devices 17 can be placed closely together and sized for a velocity which the targeted fish species are reluctant to pass through. In this embodiment, the present invention serves as a velocity curtain 20 used to divert migratory fish to a waterway 19, such as a river bypass 21, or some other form of waterway bypass. By enhancing the water flow velocity, the present invention, used as a velocity curtain 20, directs a targeted species of fish to the natural waterway thalweg 22, which the fish would follow to a conventional form of waterway bypass, such as a spillway. When used as a means to create a velocity-enhanced thalweg or channel 60, the flow velocity eductor devices 17 cause a higher flow on the outer edge of a channel, decreasing the velocity toward the center of the channel and providing a natural-like thalweg for juvenile fish to swim in, thus guiding the fish to a fishway, collection site or other form of waterway bypass. This form of guidance system would eliminate the confusion fish, such as migratory fish, encounter in a forebay of a hydroelectric facility. By providing a strong thalweg-like flow condition, the conflicting and confusing influences of turbines and eddying low velocity currents from waterway obstructions would be eliminated.

In another preferred embodiment, the present invention can be placed in an artificially created waterway or other water environment to provide a waterway habitat for migratory fish. Referring again to FIG. 4, once the requirements of a targeted fish species are known, an intersticed safety/feeding area 30 can be created which is species friendly and predator prohibitive. For example, in its use as an artificial spawning site 31, the requirements of the targeted fish species, such as gravel size, temperatures and flows, are first determined and then duplicated as closely as possible. The installation of the flow velocity eductor devices 17 provides the water flows, velocities and temperatures necessary to attract fish to such sites, to encourage the targeted species of fish to use the sites, and to keep the sites silt-free. In this way, such spawning sites provide a safe, natural, and maintenance free water environment (because there are no dangerous moving parts to the apparatus of the present invention) for both adult and juvenile migratory fish.

The present invention also can be used as a selective temperature modification system 40 within the waterway 19. In this function, the flow velocity eductor apparatus 17 is used to withdraw water of a particular temperature from one area of the waterway 19, such as in a reservoir or a lake, and introduce it into an area with a differing temperature in the waterway, such as a fish bypass, to provide a required temperature for a targeted fish species, for example, to produce an optimum temperature for an artificially created fish habitat.

Placed in a tailrace below a spillway to a dam or other obstruction, the flow velocity eductor apparatus 17 provides water current continuity 50 in the waterway 19. This eliminates eddying and turbulence below the obstruction, which would shorten the time migrating juvenile fish spend in the tailrace after passing over the spillway. With removal of eddying or turbulence below the spillway, the juvenile fish are not confused or disoriented, and therefore are not as subject to predation. This ensures a greater survival rate for juvenile fish passing over the spillway.

Figure 5:
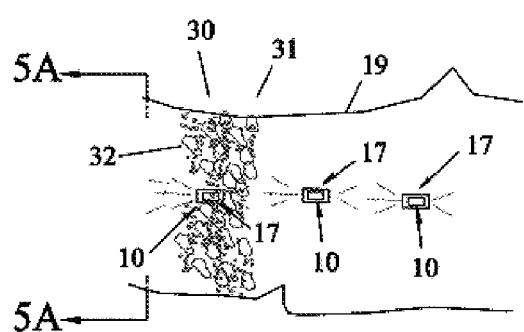
FIG. 5 Shows the flow velocity enhancement system placement in perspective view according to the present invention when used to create an environment or habitat in a lake or reservoir.
Figure 5A:
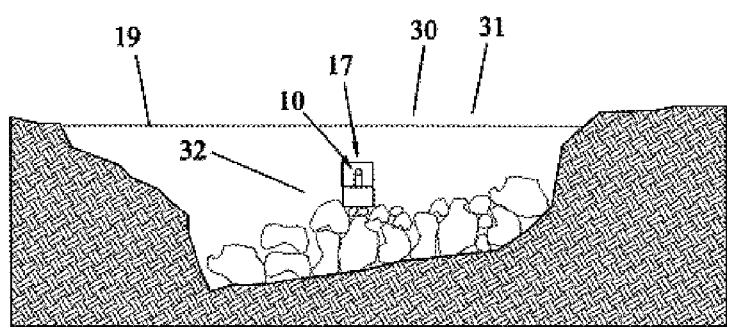
FIG. 5a Shows the flow velocity enhancement system placement in cross sectional view according to the present invention when used to create an environment or habitat in a lake or reservoir.

Referring now to FIGS. 5 and 5*a*, these figures illustrate creation of the artificial habitat or environment in waterways 19, such as reservoirs or lakes. The present invention allows for the creation of the fish-friendly waterway habitat, such as the spawning site 31 referenced in FIG. 4, or the intersticed safety/feeding area 30 for juvenile fish on their outward migration. In this embodiment, rubble fill 32 is used as a waterway base for the flow velocity eductor apparatus 17 to bring the waterway bottom to an optimum depth preferred by the targeted species of fish. Flow velocity eductor devices 17 are then placed in a position necessitated by the intended use to direct the fish in the waterway 19. The venturi eductors 10 will provide the water flow or thalweg, and water velocity, necessary to provide a river-like flow across the fish habitat created in the waterway 19. The venturi eductors 10 are sized for optimum water flow and velocity, and the flow velocity eductor devices are placed in the waterway 19 to provide conditions necessary to attract spawning fish adults, so that they may hatch the eggs they deposit there.

For use as the intersticed safety/feeding area 30 fish habitat, in FIGS. 5 and 5*a*, the present invention may be adjusted similarly to incorporate optimum conditions for any targeted fish species. Rubble fill 32 is used to achieve an optimum depth, and then flow velocity eductor devices 17 are placed on the fill to provide optimum flows and velocities across the waterway 19 area. The waterway 19 habitat is designed with cobbles large enough to provide cracks or interstices for the juvenile fish to hide in while eliminating ambush sites for predator species. Aquatic food sources preferred by the targeted species are then introduced. This provides a safe, natural, river-like, resting and feeding area for the outwardly migrating juveniles and allows them to migrate at their own pace.

Figure 6:
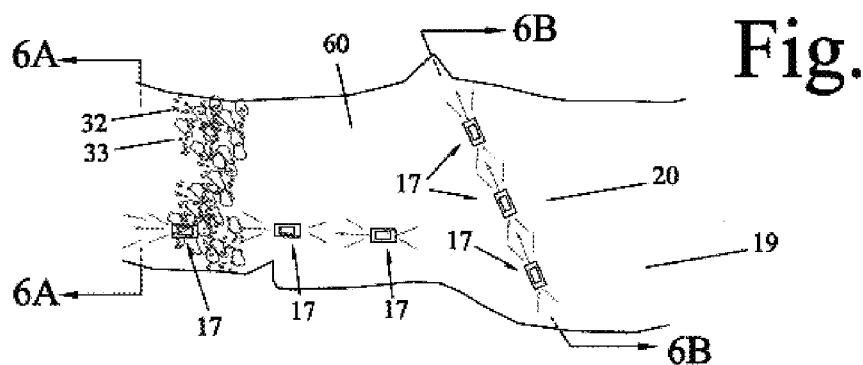
FIG. 6 Shows the placement of the flow velocity enhancement system in perspective view according to the present invention when used as a behavioral guidance system.
Figure 6A:
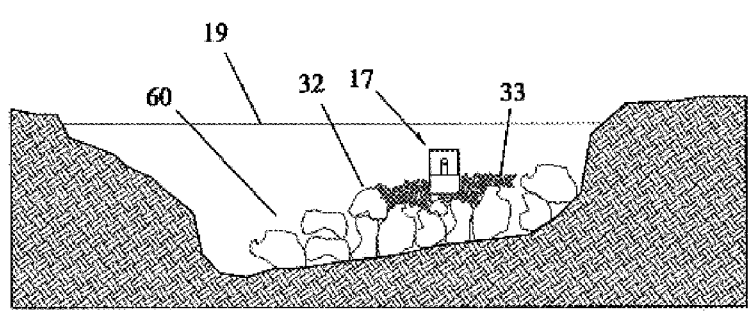
FIG. 6a Shows the placement of the flow velocity enhancement system in cross sectional view according to the present invention when used as a behavioral guidance system.
Figure 6B:
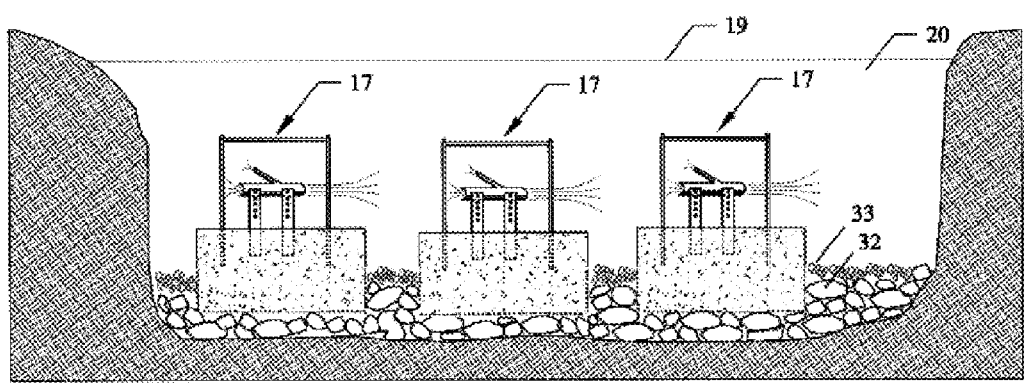
FIG. 6b Shows the placement of the flow velocity enhancement system in cross sectional view according to the present invention when used as a velocity curtain.

Referring now to FIGS. 6, 6*a* and 6*b*, the present invention serves as a behavioral guidance system, either as a velocity-enhanced thalweg or channel 60 or as the velocity curtain 20, to guide fish to a desired area or away from a harmful or dangerous zone, such as the turbine intakes in a dam.

In FIGS. 6, 6*a* and 6*b*, rubble fill 32 is used to shape a waterway 19 channel or river-like base along a waterway shore of the reservoir, lake or other waterway. Flow velocity eductor devices 17 are placed across the waterway 19 channel in the case of the velocity curtain 20, or on the outside of the waterway 19 channel in the case of the velocity-enhanced thalweg or channel 60, and are situated to provide flow velocities through which the juvenile fish are reluctant to pass. A fish-friendly habitat or environment is created for the targeted species through the placement of cobbles and gravels 33 in the waterway to attract the fish. The channel provides hiding areas for the smaller juvenile fish while eliminating ambush sites for fish predators.

Higher flow velocities on the outer edge of the channel encourage the juvenile fish to use the channel while the decreased velocity in the center of the channel provides a natural-like thalweg for the juvenile fish to travel in; thus, the fish can be guided to a desired fishway bypass or fish collection site.

FIG. 7 illustrates a use of the flow velocity eductor apparatus 17 as the selective temperature modification system 40 to provide cooler or warmer water to the waterway, since water temperature is another means of attracting a targeted species of fish to a waterway area and encouraging them to use that area. This process of selective withdrawal under the present invention is inexpensive to produce and use, and provides a means of cheaply providing an optimum water temperature to one of the natural or artificial environments already described above.

FIG. 7 shows the flow velocity eductor apparatus 17 placed on the bottom of a reservoir or lake. A water flow extension 41, including but not limited to a pipe, snorkel, conduit or other device, is extended from a desired waterway 19 thermal layer to the flow velocity eductor apparatus. Another extension 41 is extended to a desired waterway 19 site from the flow velocity eductor apparatus 17. The mixing of water of one temperature from one thermal layer of the waterway with water of another temperature in another area of the waterway may be accomplished by operating the flow velocity eductor apparatus through thermostatic controls.

The applications of the present invention can range from a simple manual operation to a fully automatic computer/satellite control system. Telemetry or hydroacoustic tracing of a targeted fish species can be linked to a computer (not shown) to activate the system as the targeted species approaches a hydroelectric site. This embodiment of the present invention would reduce operating and maintenance costs.

Having thus described in detail a preferred selection of embodiments of the present invention, it is to be appreciated and will be apparent to those skilled in the art that many physical changes could be made in the apparatus or the method without altering the invention, or the concepts and principles embodied therein. The invention does not require that all the advantageous features and all the advantages need to be incorporated into every embodiment of the invention. The present embodiments are therefore to be considered in all respects as illustrative and not to be restrictive.

ADVANTAGES OF THE INVENTION

The reader will see that the flow velocity enhancement system provides a fish behavioral guidance system that is versatile and has many advantages over the prior or related art in that:

(A) The device duplicates the thalweg or bulk flows on which migrating fish orient.

(B) The device is versatile and adaptable for more than one species of fish or one intended use.

(C) The device is cost effective because of the use of commercially available components.

(D) The device is cost effective because of its low power requirements and because it does not require large structures to create a static head differential.

(E) The device is easy to assemble, install and maintain, and can simplify the problems at water intakes.

(F) The invention can produce a defined guidance zone in a selected waterway.

(G) The device is biologically sound as it can supply river-like environments in a reservoir, lake, or other waterway.

(H) The invention is politically popular because it solves the problem of fish passage in a safe, natural manner.

(I) The device is aesthetically acceptable in that it is submerged and out of sight and enhances a reservoir or other waterway environment while guiding fish.

(J) The device poses no danger to normal reservoir, lake or other waterway traffic.

Although the description of this invention contains many specifics, these are not meant to limit the scope of the invention. They are an illustration of some of the preferred embodiments of the present invention. It will be appreciated that many modifications and variations and uses of the present invention will become obvious to someone skilled in the area of the present invention. Although the present invention has been described in considerable detail with reference to certain preferred versions thereof, other versions are possible.

I claim:

1. An apparatus for providing within a waterway a fish guidance system, the apparatus comprising:

(a) means for generating a velocity head differential in the waterway when said means is installed in the waterway; said generated velocity head differential including:

(1) a venturi eductor having an eductor tube including a sidewall defining a bore extending there through, said eductor tube having a water intake end and a water discharge end; and (2) a venturi nozzle having water inlet and outlet ends, said venturi nozzle having the outlet end connected in water conducting relationship to the eductor tube at an acute angle directed toward the discharge end of the eductor tube;

(b) means for using said generated velocity head differential when said generating means is installed in the waterway to create a current of water within said waterway which fish can sense and use to guide them during their travel through the waterway; and (c) means for directing said generated current of water in said waterway in a desired direction whereby the fish that sense said current of water will travel in the direction of said current of water.

2. An apparatus as defined in claim 1 in which the means for generating a velocity head differential in a the waterway includes:

(a) a pressure motive water source connected in water conducting relationship with the venturi nozzle thereby creating reduced pressure within said eductor tube so such that during operation of the pressure motive water source water is drawn into the eductor tube at the intake end at a first velocity and discharged at the discharge end at a velocity greater than the first velocity at the intake end.

3. An apparatus as defined in claim 1 including a frame means for supporting in said waterway said means for using said generated velocity head differential to create a current of water within said waterway; and (a) a plurality of mounting holes located within said frame means for adjusting the angle of the generating means.

4. A method for providing a fish guidance system in a waterway, the method comprising the steps of:

(a) generating a velocity head differential;

(b) using the generated velocity head differential to create a current of water within the waterway which fish can sense and use to guide them during their travel through the waterway;

(c) directing the current of water so created within the waterway in a desired direction whereby the fish that sense said current of water will travel in the direction of said generated current of water;

(d) providing a venturi eductor having an eductor tube including a sidewall defining a bore extending there through, said eductor tube having a water intake end and a water discharge end; and (e) providing a venturi nozzle having water inlet and outlet ends, said venturi nozzle having the outlet end connected in water conducting relationship to the eductor tube at an acute angle directed toward the discharge end of the eductor tube.

5. A method as defined in claim 4 in which the step of generating a velocity head differential includes:

(a) providing a pressure motive water source connected in water conducting relationship with the venturi nozzle thereby creating reduced pressure within the eductor tube so such that during operation of the pressure motive water source water is drawn into the eductor tube at the intake end at a first velocity and discharged at the discharge end at a velocity greater than the first velocity at the intake end.

6. A method as defined in claim 4, wherein the venturi eductor is mounted on an adjustable frame having a plurality of adjustable mounting holes and being anchored into a base means, further including the steps of:

(a) maintaining the venturi eductor in a stationary mode and firmly seated on the base means; and (b) allowing for adjustment of positions of the venturi eductor within the waterway depending on types of fish in the waterway.

7. A method as defined in claim 4, further comprising the steps of:

(a) attaching an at least one water flow extension device to the intake end and to the discharge end of the venturi eductor, the at least one water flow extension device selected from a group consisting of a pipe, snorkel and a conduit; and (b) locating the venturi eductor in the waterway to withdraw water of one temperature in a first area of the waterway and introducing said water of one temperature into a second area of the waterway, to create a new waterway water temperature in the second area of the waterway.

* * * * *